United States Patent [19]

Stebbins

[11] 3,953,917

[45] May 4, 1976

[54] METHOD FOR FREEING A FASTENER

[76] Inventor: David T. Stebbins, 4055 Executive Park Drive, Cincinnati, Ohio 45241

[22] Filed: Aug. 27, 1973

[21] Appl. No.: 391,782

[52] U.S. Cl. .................................... 29/427; 134/40; 252/67; 252/69

[51] Int. Cl.² .......................................... B23P 19/02

[58] Field of Search ...................... 29/426, 427, 401; 252/67, 69, 90, 305, 306, 308, 68; 62/64; 134/35, 40, 42

[56] References Cited

UNITED STATES PATENTS 3,455,012 7/1969 Stoll ................................ 29/426 X

FOREIGN PATENTS OR APPLICATIONS 4,499 4/1885 United Kingdom .................. 29/426

*Primary Examiner*—Victor A. Di Palma
*Attorney, Agent, or Firm*—James W. Pearce; Roy F. Schaeperklaus

[57] ABSTRACT

A stream of a pressurized liquid, which is a gas at ambient temperature, is directed against a head of a threaded fastener to chill the fastener to cause release of the fastener from its socket so that the fastener can be turned to release the fastener.

8 Claims, 2 Drawing Figures

METHOD FOR FREEING A FASTENER

Figure 1:
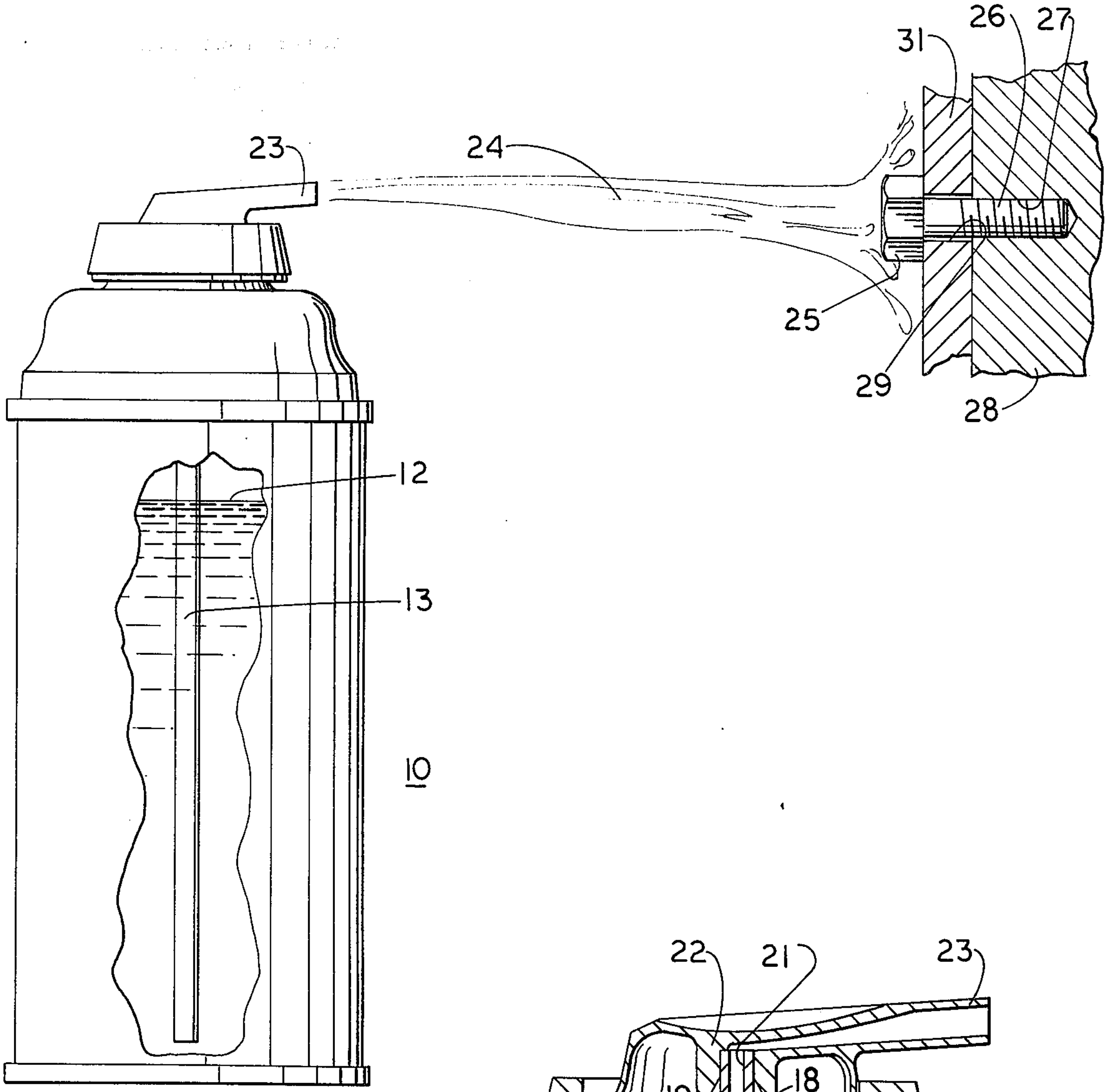

This invention relates to a method and composition for causing release of a threaded fastener or the like.

Metal fasteners can corrode when in place in a socket for a substantial period and can become tightly fixed and difficult to remove. An object of this invention is to provide a method for quickly freeing a threaded fastener.

A further object of this invention is to provide a method of quickly cooling a fastener to cause the fastener to contract so that it can readily be freed from its socket.

Briefly, this invention provides a method of freeing a threaded fastener in which a stream of a liquid which rapidly evaporates is directed against a head of the fastener. As the liquid evaporates, the fastener is rapidly chilled and shrinks to become free in the socket in which it is received so that the chilled fastener can readily be turned to release it. The liquid is directed from a container in which the liquid is held under pressure. A stream of the liquid is directed against the head of the fastener. The liquid can be one which rapidly evaporates when it hits the fastener head at room temperature, such as isobutane, propane, or dichlorodifluoromethane.

Figure 2:
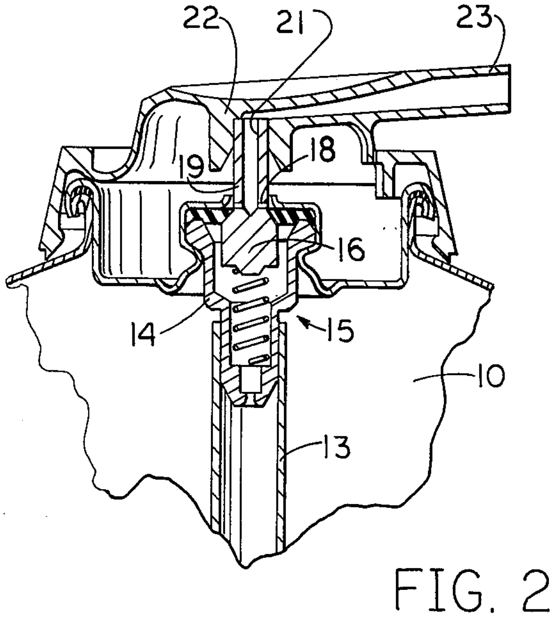

The above and other objects and features of the invention will be apparent to those skilled in the art to which this invention pertains from the following detailed description and the drawing, in which:

FIG. 1 is a view in side elevation of a dispensing pressure container in association with a fastener and elements fastened together by the fastener, the elements being shown in upright section; and FIG. 2 is a fragmentary view in upright section of an upper portion of the container shown in FIG. 1.

In the following detailed description and the drawings, like reference characters indicate like parts. In FIGS. 1 and 2 is shown a container 10 for fluid 12 (FIG. 1) held under pressure. A dip tube 13 directs liquid to a hollow valve housing 14 (FIG. 2) of a valve assembly 15. When a spring-pressed plunger 16 is depressed, liquid can flow upwardly through the dip tube 13 and the valve housing 14 to be discharged through radial openings 18 in a stem 19 of the plunger 16 and through an upwardly opening bore 21 in the stem 19 to a dispensing head 22 mounted on the stem 19. The liquid is discharged through a spout 23 of the head 22 as a stream 24 (FIG. 1). The stream 24 is directed against a head 25 of a threaded fastener 26, which is seated in a socket 27 in a metal block 28 or the like. The fastener 26 can extend through a bore 29 in a plate 31 which is held in assembled relation with the block 28 by the fastener 26. When the liquid stream 24 hits the head 25, the liquid rapidly evaporates so that the fastener 26 is chilled, and the fastener 26, as it is chilled, shrinks sufficiently to be released from the socket 27 so that the fastener 26 can readily be turned by an appropriate tool (not shown) to remove the fastener 26 from the socket 27 and to release the plate 31 from the block 28.

The liquid can be one which can be stored in the container 10 under moderate pressure but which rapidly evaporates at room or ambient temperature to chill the fastener to a sufficiently reduced temperature that the fastener becomes free from its socket. A suitable pressurized liquid can have the following formula, all parts being by weight:

| | |
|---|---|
| 30 | parts Dichlorodifluoromethane |
| 37 | parts Isobutane |
| 23 | parts Propane |
| 10 | parts 1, 1, 1 trichloroethane |

The dichlorodifuoromethane, isobutane, and propane all provide a much reduced temperature on evaporation. The trichloroethane serves to reduce the pressure at which the constituents must be stored. In addition, the trichloroethane serves as a solvent dissolving grease which can be on the head 25 of the fastener 26 to permit the other constituents to reach the head 25. The openings in the stem of the plunger 16 are sufficiently large that the liquid is discharged as a stream so that the evaporation is at the head of the fastener 26.

The method and composition of this invention makes it possible to rapidly and easily remove fasteners which have become firmly anchored.

Having described my invention, what I claim as new and desire to secure by letters patent is:

1. A method of freeing a threaded metal fastener from a threaded socket which comprises directing a stream of a pressurized liquid which is a gas at ambient temperature against a head of the fastener to chill the fastener, and turning the fastener while chilled to free the fastener.

2. A method as in claim 1 wherein the liquid includes a grease solvent which dissolves grease on the head of the fastener to permit the liquid to impinge on the head of the fastener.

3. A method as in claim 1 wherein the pressurized liquid consists essentially of dichlorodifluoromethane, isobutane, propane, and 1,1,1 trichloroethane.

4. A method as in claim 1 wherein the pressurized liquid consists essentially of 30 parts dichlorodifluoromethane, 37 parts isobutane, 23 parts propane, and 10 parts 1,1,1 trichloroethane, all parts being by weight.

5. A method of freeing a male thread of a metal first member from engagement with a female thread of a second member which method comprises directing a stream of a pressurized liquid which is a gas at ambient temperature against the first member to chill the first member and turning the first member relative to the second member to free that member from the second member.

6. A method as in claim 5 wherein the liquid includes a grease solvent which dissolves grease on the first member to permit the liquid to impinge directly on the first member.

7. A method as in claim 5 wherein the pressurized liquid consists essentially of dichlorodifluoromethane, isobutane, propane, and 1,1,1 trichloroethane.

8. A method as in claim 5 wherein the pressurized liquid consists essentially of 30 parts dichlorodifluoromethane, 37 parts isobutane, 23 parts propane, and 10 parts 1,1,1 trichloroethane, all parts being by weight.

* * * * *